(12) United States Patent
Ning (10) Patent No.: US 6,968,064 B1
(45) Date of Patent: Nov. 22, 2005

(54) ADAPTIVE THRESHOLDS IN ACOUSTIC ECHO CANCELLER FOR USE DURING DOUBLE TALK

(75) Inventor: Aidong Ning, San Jose, CA (US)

(73) Assignee: Forgent Networks, Inc., Austin, TX (US)

( * ) Notice: Subject to any disclaimer, the term of this patent is extended or adjusted under 35 U.S.C. 154(b) by 651 days.

(21) Appl. No.: 09/965,959

(22) Filed: Sep. 28, 2001

Related U.S. Application Data (60) Provisional application No. 60/236,955, filed on Sep. 29, 2000.

(51) Int. Cl.[7] ............................. H04B 3/20; H04M 9/08
(52) U.S. Cl. .............. 381/66; 379/406.14; 379/406.12; 381/94.3
(58) Field of Search ...................... 381/66, 94.2–94.3; 379/406.01, 406.08, 406.12, 406.13, 406.14, 379/406.15, 406.16; 370/286, 289, 290

(56) References Cited

U.S. PATENT DOCUMENTS

| | | | | |
|---|---|---|---|---|
| 5,485,515 A | * | 1/1996 | Allen et al. ................. | 379/391 |
| 5,587,998 A | * | 12/1996 | Velardo et al. ............. | 370/289 |
| 6,438,225 B1 | * | 8/2002 | Tahernezhaadi ........ | 379/406.01 |
| 6,574,336 B1 | * | 6/2003 | Kirla ..................... | 379/406.01 |
| 6,628,781 B1 | * | 9/2003 | Grundstrom et al. .. | 379/406.14 |
| 6,757,385 B1 | * | 6/2004 | Ehrenstråle et al. ... | 379/406.14 |

* cited by examiner

*Primary Examiner*—Xu Mei
(74) *Attorney, Agent, or Firm*—Ruben C. DeLeon; Winstead Sechrest & Minick P.C.

(57) ABSTRACT

Disclosed is an apparatus for cancelling far endpoint echo signals in audio signals transmitted from a near endpoint to a far endpoint. In one embodiment, the apparatus includes a near endpoint analysis filter bank operable to divide a near endpoint signal into a plurality of near endpoint subband signals, a far endpoint analysis filter bank operable to divide a far endpoint signal into a plurality of far endpoint subband signals, and a background signal power estimator operable to determine background noise at the near end.

16 Claims, 12 Drawing Sheets

ADAPTIVE THRESHOLDS IN ACOUSTIC ECHO CANCELLER FOR USE DURING DOUBLE TALK

RELATED APPLICATIONS

This application claims priority to provisional application 60/236,955 filed Sep. 29, 2000 and entitled Adaptive Thresholds In Acoustic Echo Canceller For Use During Double Talk.

BACKGROUND OF THE INVENTION

1. Field of the Invention

This invention relates generally to echo cancellation in audio/video systems. More specifically, this invention relates to generating adaptive thresholds for use in an echo canceller in two-way audio/video systems.

2. Description of the Related Art

There are four "talk" states in two-way audio and video systems. The first is "near endpoint only" where there is talk only at the local end. The second talk state is "far endpoint only" where there is talk only at the remote end. The third is double talk where there is talk at both ends at the same time. And the fourth talk state is idle, where both ends are quiet.

Among the four talk states, echo cancellation during the double talk state presents the most challenge. This is because there are no echoes in the near endpoint only and idle states, and it is relatively easy to suppress echo in a far endpoint only state. During the double talk state, however, the amount of noise suppression applied to voice signals must be reduced to avoid filtering out the near endpoint audio signal.

In previous audio and video systems, fixed thresholds are used to detect double talk in voice signals. To determine the thresholds, static measurements are taken during development of the system, to get the energy levels of the voice input signal from the microphones during each of the talk states. During the double talk state, the energy level is typically higher than the level measured during the far endpoint only state. During development, measurements of voice signals are made using a particular physical set-up of rooms, equipment, and speaker geometry. When the systems are deployed, however, different equipment and room arrangements are used, and the use of static thresholds for echo cancellation may result in sub-optimal system performance.

Further difficulties with echo cancellation arise when the system is in a noisy room, when the microphone is positioned closer to the speaker than expected, and when another manufacturer's equipment is substituted for the original equipment in the system. These factors are particularly important with the growing popularity of video and audio conferencing using personal computer systems, hand-free cellular telephones, and speakerphones.

Thus it is desirable to provide video and audio systems that include echo cancellation filters with thresholds that adapt to changes in equipment, position of the equipment, and room geometry.

SUMMARY OF THE INVENTION

Disclosed is an apparatus for cancelling far endpoint echo signals in audio signals transmitted from a near endpoint to a far endpoint. In one embodiment, the apparatus includes a near endpoint analysis filter bank operable to divide a near endpoint signal into a plurality of near endpoint subband signals, a far endpoint analysis filter bank operable to divide a far endpoint signal into a plurality of far endpoint subband signals, and a background signal power estimator operable to determine background noise at the near end.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

By way of example, the present invention is disclosed herein as applied in a video conferencing system. It is important to note, however that the present invention for acoustic echo cancellation is applicable in many types of two-way communication systems including audio and video conferencing systems, speakerphones, and hands-free portable telephones.

Figure 1:
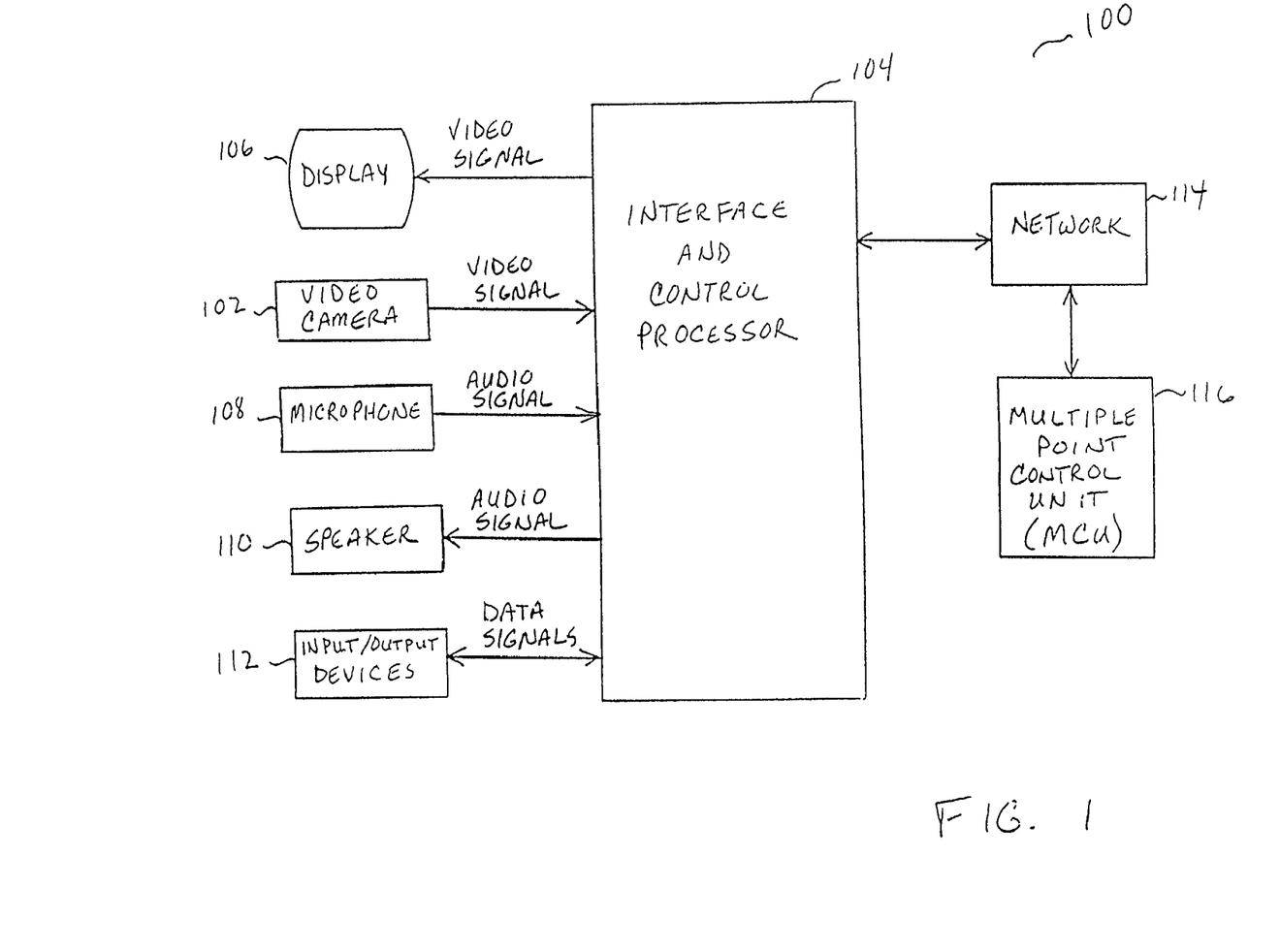
FIG. 1 is a diagram of components typically included in an endpoint of a video conference system.

FIG. 1 is a schematic block diagram of components typically included in an endpoint 100 of a video conference system. The arrangement shown in FIG. 1 includes video camera 102 for capturing images of conference participants, their surrounding environment, and other objects within the field of view of video camera 102. Hardware and/or software controls (not shown) may be connected to video camera 102 for controlling pan, zoom, and tilt of the camera. Video camera 102 generates an analog or digital video signal of the captured image that is input to interface and control processor 104. One or more monitors 106 are connected to receive video signals from interface and control processor 104, wherein the video signals may include images from one or more of the endpoints connected to the video conferencing system. Monitors 106 may be capable of displaying images from multiple endpoints in a split screen format. Endpoint 100 also includes microphone 108 for generating analog or digital audio signals, speaker 110 for broadcasting audio information, and input/output devices 112 such as a keyboard, a mouse, voice recognition system, light pens, electronic pens, pen pads, touch screen displays and other devices connected to allow a user to generate inputs.

Multiple endpoints communicate via network 114. The endpoints may be coupled directly in a point-to-point call, or coupled through a central switch, commonly referred to as multiple point control unit (MCU) 116. Other video conference systems can also be connected with endpoint 100, for example in a multi-point call, and will generally be joined to the video conference through MCU 116. Each video conference system includes circuitry for transmitting and receiving compressed digital video and audio data, as well as other kinds of data, and thus the systems communicate over digital networks. A near endpoint refers to an endpoint from which signals from microphone 108 are transmitted for output by the speakers 110 at other endpoints. Thus, each endpoint is a near endpoint with respect to the other endpoints in the system. The other endpoints are referred to as far endpoints.

Figure 2:
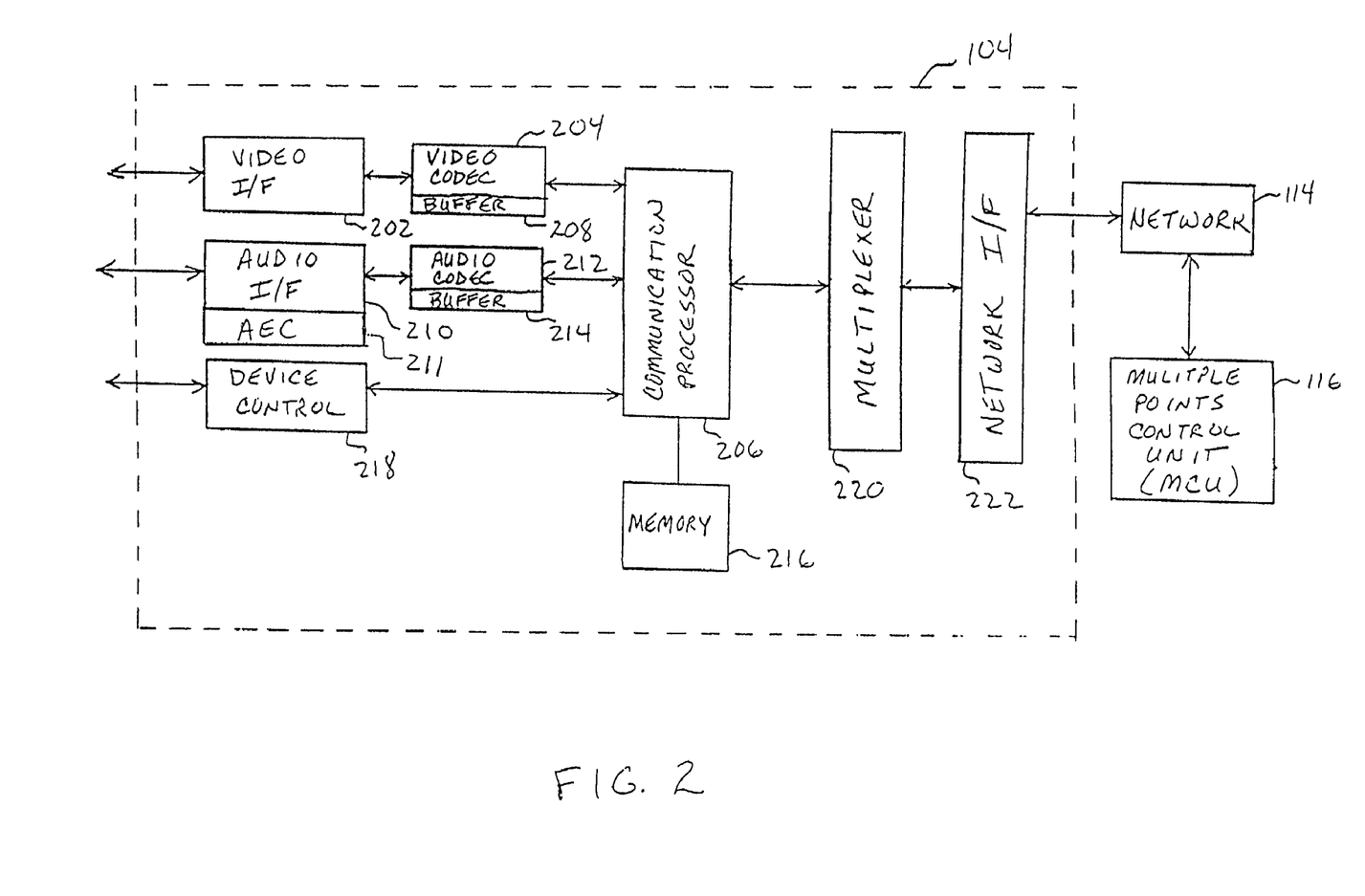
FIG. 2 is a block diagram of an embodiment of an interface and control processor with which the present invention may be utilized.

FIG. 2 shows further details of interface and control processor 104. A video interface 202 is provided for connection with camera 102 and display 106 (FIG. 1), and has an image processing function, such as screen division, image combination and character combination. Video interface 202 may also convert analog signals to digital signals and digital signals to analog signals, as required. A video coding-decoding unit (codec) 204 is provided for coding video signals supplied from video interface 202 or decoding coded video information received from communication processor 206 as input from another source such as another video conference endpoint. A video encoding routine or circuit processes raw video frame data from the endpoint into a compressed, encoded format and stores it in buffer 208 to await transmission to communication processor 206 or directly to some other component in the system. A video decoding routine or circuit in video codec 204 processes encoded video frame data from another endpoint for output to display 106 (FIG. 1). A video buffer routine controls input of raw video frame data from video interface 202, input of encoded video data from other sources through communication processor 206, output of encoded video frame data to communication processor 206, and output of raw video frame data to display 106.

Audio interface 210 is provided in interface and control processor 104 for connection with speaker 110 and microphone 108 (FIG. 1), and includes audio processing components such as acoustic echo canceller (AEC) 211, analog to digital converters (not shown), and digital to analog converters (not shown). Audio coding-decoding unit (codec) 212 is coupled between audio interface 210 and communication processor 206 for coding audio signals supplied from audio interface 210 or decoding encoded audio information received from communication processor 206 as input from another source such as another video conferencing endpoint unit. An audio encoding routine or circuit in audio codec 212 processes raw audio data from the endpoint into a compressed, encoded format and stores it in buffer 214 to await transmission to communication processor 206 or directly to some other component in the system. An audio decoding routine or circuit in audio codec 212 processes encoded audio data from another endpoint for output to speaker 110. An audio buffer routine controls input of raw audio data from audio interface 202, input of encoded audio data from other sources through communication processor 206, and output of encoded audio data to communication processor 206.

Communication processor 206 is also coupled to memory 216, device control 218, and multiplexer 220 for transmitting and receiving data. Input/output devices 112 are connected to communication processor 206 through device control 218. Communication processor 206 executes instructions to control various processing functions and the flow of data through video conferencing unit 100.

In multi-way communication systems, echoes are created when sound from a far endpoint user is output by speaker 110 (FIG. 1) and picked up by microphone 108 (FIG. 1). Without the AEC 211 in the system, the echoes are sent back to the far end, and the users at the far endpoint may hear the echoes of their own voices, which is undesirable. AEC 211 is designed to process the speaker output signal, estimate the echo of the speaker output signal in the microphone 108, and subtract the echo. This results in a signal containing only sounds originating at the near endpoint being sent to the far end.

Figure 3:
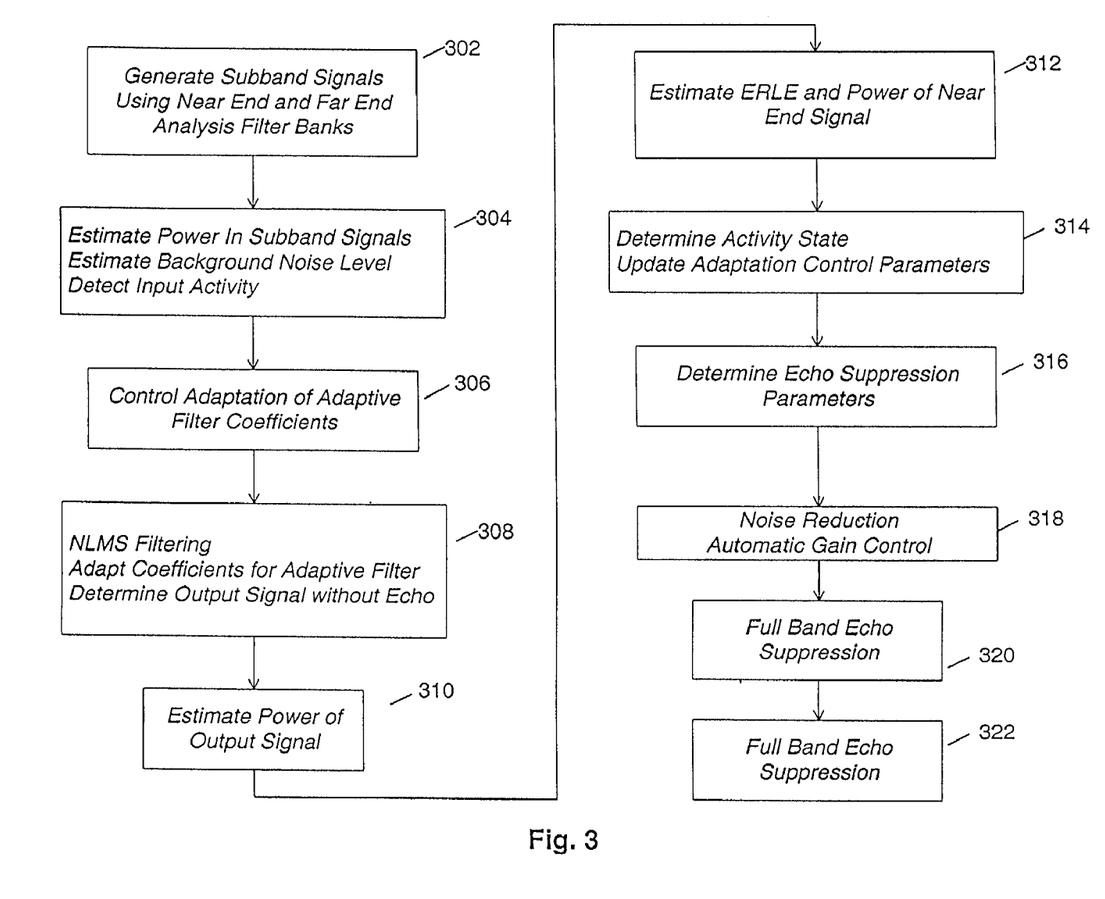
FIG. 3 is a flowchart of processes included in an embodiment of an acoustic echo canceller in accordance with the present invention.
Figure 3A:
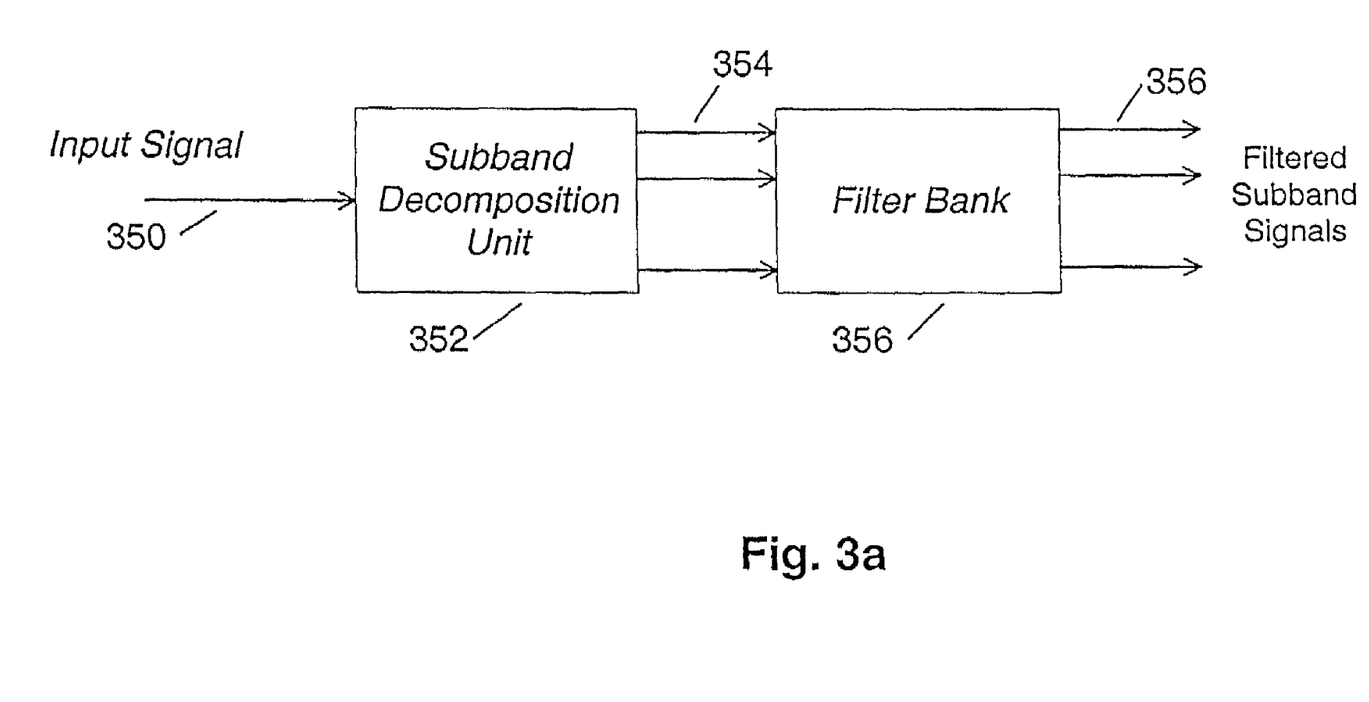
FIG. 3a is a diagram of components included in an analysis filter bank in accordance with the present invention.

Referring now to FIGS. 3 and 3a, FIG. 3 shows a flowchart of logic included in AEC 211 (FIG. 2) and FIG. 3a shows components included in an example of an analysis filter bank 348. In process 302, an input signal 350, such as speaker output signals and microphone input signals, is divided into a number (N) of subbands, or channels, in subband decomposition unit 352. The subband signals 354 are output in the frequency domain, and input to a bank of filters 356. Filter bank 356 is a uniform filter bank, i.e., each of N subbands has the same spectral shape at uniform frequency spacing. Filter bank 356 may employ N filters for respective channels, or Filter bank 356 may employ a single filter which is repeatedly used for each subband.

Figure 4:
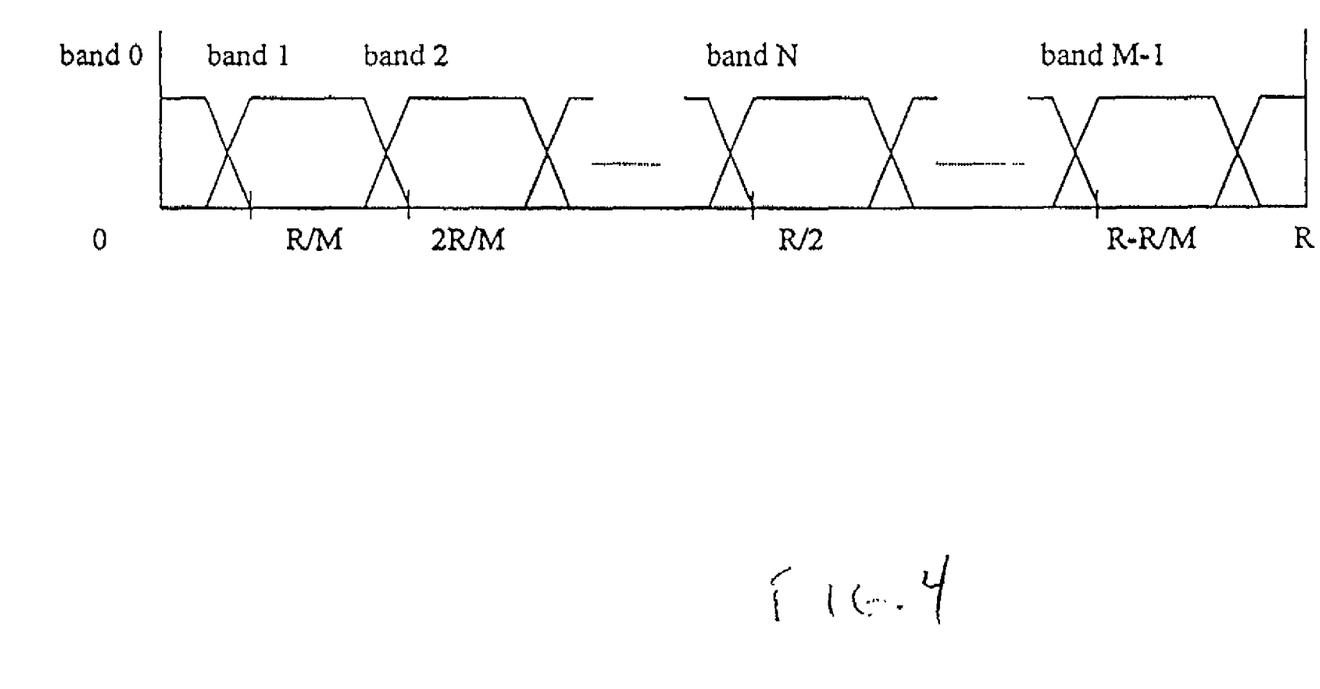
FIG. 4 is a diagram showing decomposition of frequency subbands used in a bank of analysis filters in the acoustic echo canceller.

FIG. 4 shows an example of parameters for subband decomposition as used in subband decomposition unit 352, where R is the sample rate of the input signal, and each subband has a bandwidth of R/M Hz that can be sampled down to R/D samples/second, where M is greater than or equal to D. The following table shows examples of values for parameters N, M, and D at 8 kHz and 16 kHz sample rates, R.

| R | N | M | D | Filter Length | Subband Bandwidth |
| --- | --- | --- | --- | --- | --- |
| 8 kHz | 16 | 32 | 25 | 512 | 250 Hz |
| 16 kHz | 32 | 64 | 50 | 768 | 250 Hz |

Figure 5:
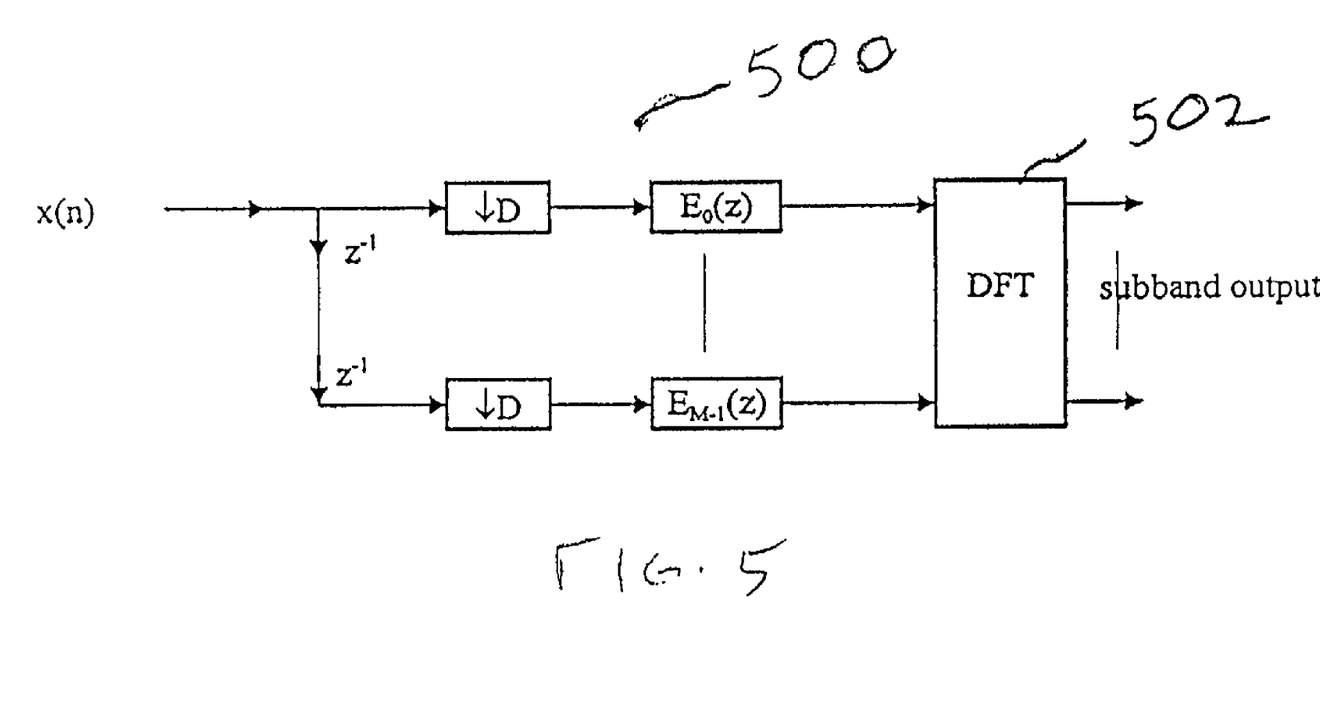
FIG. 5 is a diagram of a polyphase implementation of an analysis filter bank, in accordance with the present invention.

In one embodiment, FIG. 5 shows an implementation of the filter bank 356 (FIG. 3a) as a polyphase filter 500 and M-point discrete Fast Fourier Transform (DFT) 502. The input signal is x(n) and $H_0(z)$ is the output of filter 500 that is calculated by $$H_0(z) = \sum_{l=0}^{M-1} z^{-l} E_l(z^D)$$

For implementation efficiency, the output from each channel of the filter bank 356 may be sampled concurrently with the input being filtered in the corresponding polyphase filter 500.

Figure 6A:
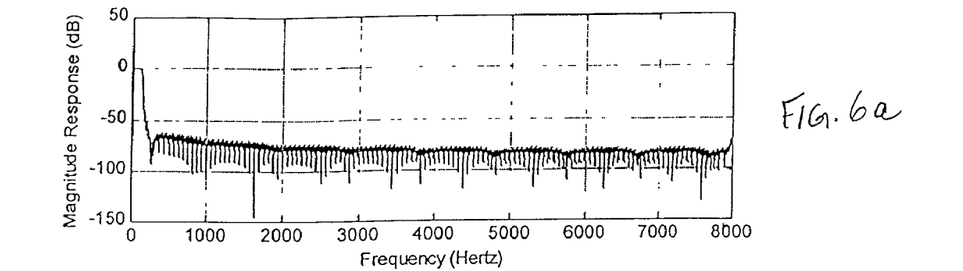
FIGS. 6a and 6b show the frequency response of the bank of analysis filters at 16 kHz.
Figure 6B:
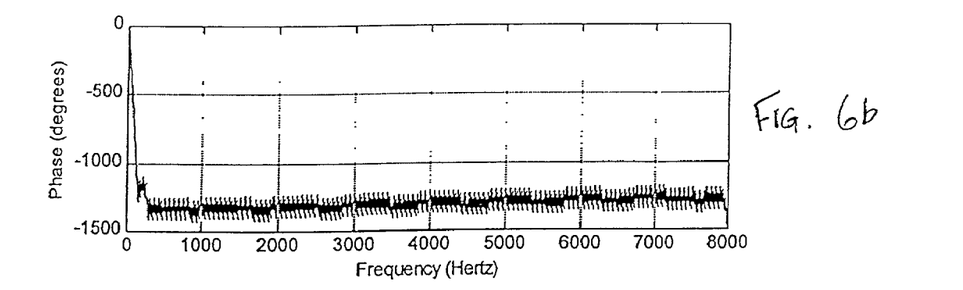
Figure 6C:
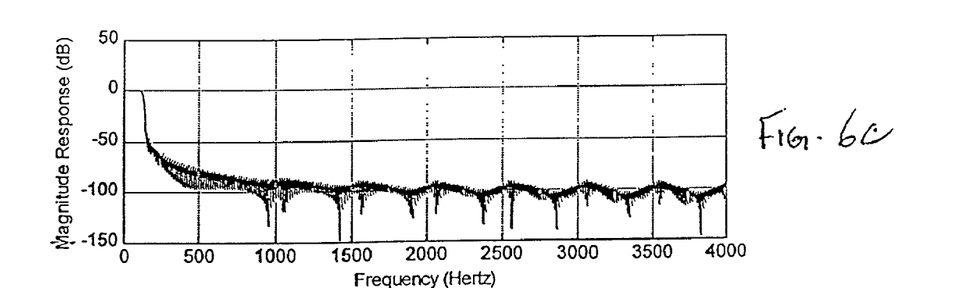
FIGS. 6c and 6d show the frequency response of the bank of analysis filters at 8 kHz.
Figure 6D:
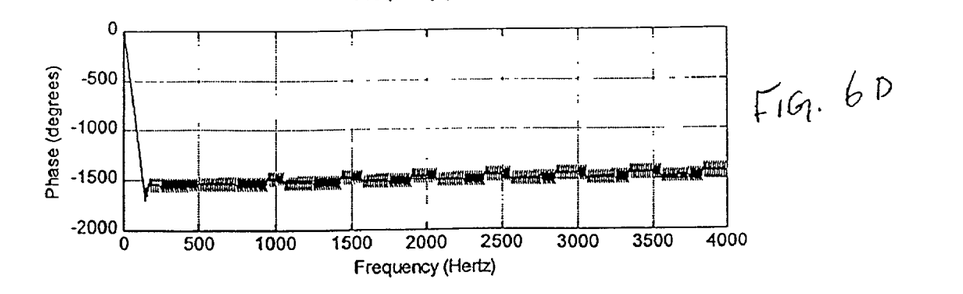

The filter banks include a low pass filter (LPF) which is designed at the original sampling frequency. This LPF is known as the prototype filter. The frequency response (magnitude and phase) of an example of the LPF is shown in FIGS. 6a and 6b for 16 kHz and FIGS. 6c and 6d for 8 kHz.

Referring again to FIG. 3, once the speaker output and microphone signals have been processed through a filter bank, such as filter bank 356, short term speech activity in these signals is detected by comparing the current short term power against the long term background noise power in process 304. The speech signals which are of interest in process 304 include the speaker output signal, the microphone input signal, as sensed by local microphone 108, and the near endpoint echo signal as estimated within AEC 211. The far endpoint background noise and the near endpoint background noise is also estimated in process 304. Background noise and near endpoint signals are measured one or more times per frame and the power of these signals is estimated using the subband power signals.

Figure 7:
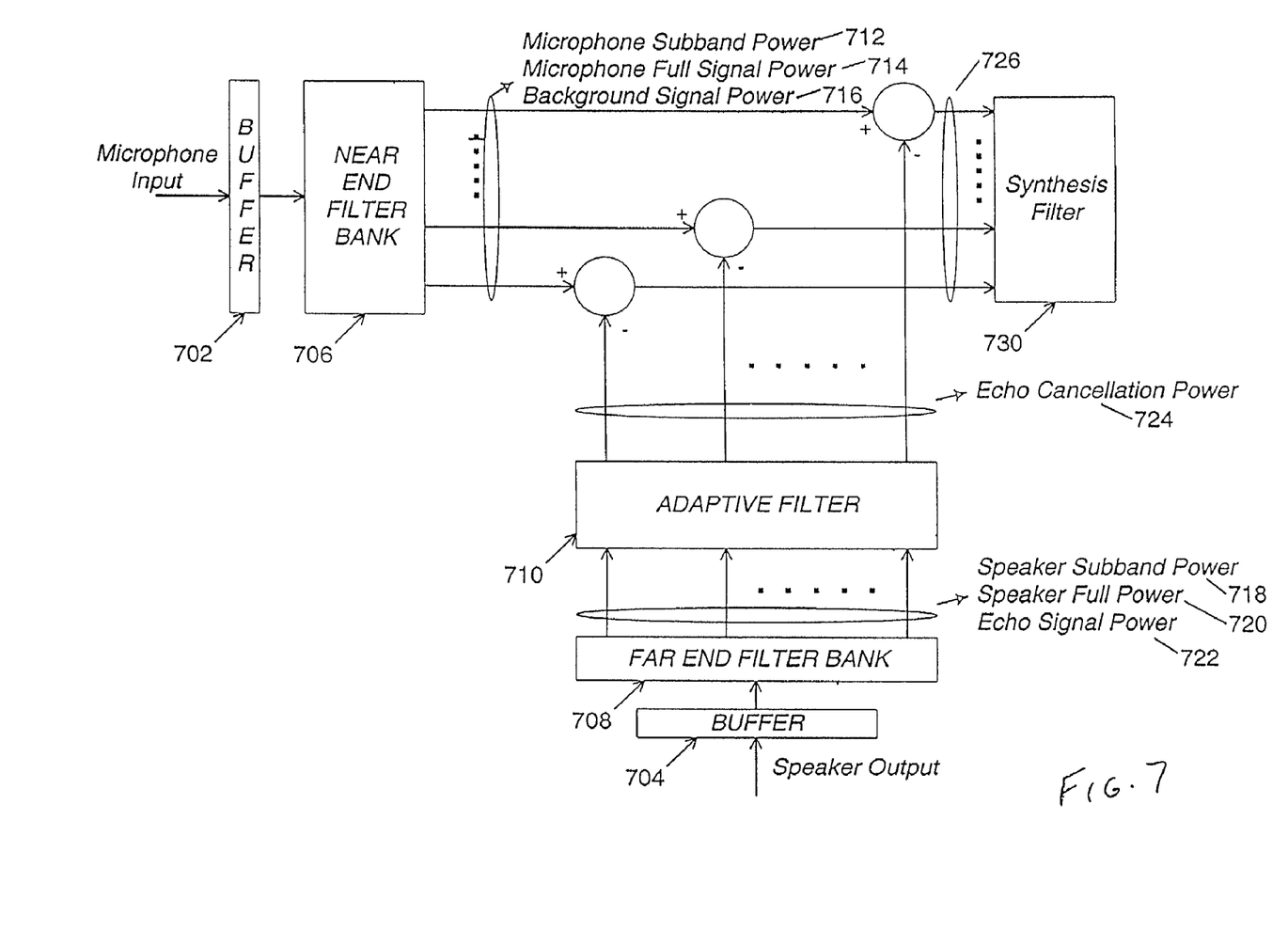
FIG. 7 is a diagram of a system for estimating subband power and full power in near endpoint and far endpoint signals in accordance with the present invention.

FIG. 7 shows one embodiment of an arrangement of components included in the present invention for estimating subband and full band power signals of the near endpoint and far endpoint signals. Buffers 702 and 704 store samples of the microphone input signal and speaker output signals, respectively, for a fixed time period, such as 1.6 seconds, for example. Near end analysis filter bank 706 and far endpoint analysis filter bank 708 represent components that are used in process 302 (FIG. 3) to divide the microphone input signal and the speaker output signal, respectively, into a number of subbands signals as described hereinabove for the analysis filter bank 348 shown in FIG. 3a. Subband power signals are calculated using the signal in that subband. The full band power signal is the sum of all or a portion of the subband power signals.

The power signals are estimated as follows:
a. current instant power level $$newpwr[i] = \sum_{j} (|real(x[j])| + |imag(x[j])|)$$

where
  newpwr[i] is the sampled signal, and
  x[j] is the jth sample of subband i in a block j for microphone input and speaker output subband signals.
b. smoothed power estimate
  if (newpwr[i] > power[i])
    power[i] = $(1-\alpha_{up})$*power[i] + $\alpha_{up}$*newpwr[i]
  else
    power[i] = $(1-\alpha_{dn})$*power[i] + $\alpha_{dn}$*newpwr[i]
  where
    $\alpha_{up}$ is a filter time constant for smoothing an increasing signal, and
    $\alpha_{dn}$ is a filter time constant for smoothing a decreasing signal.
c. full band power $$full\_power = \sum_{i} power[i] \quad i = start\_subband, \ldots end\_subband.$$

The values chosen for the time constants $\alpha_{up}$ and $\alpha_{dn}$, the start_subband, and the end_subband may be different, based on the signal characteristics, at the different power levels.

Thus, microphone subband power signals 712, microphone full signal power signal 714 can be determined with the subband signals output from near end filter bank 706. Near end background power signal 716 and far end background power signal 717 can also be estimated by background power signal estimator 732 with the subband signals output from near end filter bank 706 and far end filter bank 706. Similarly, speaker subband power signal 718, speaker full power signal 720, and echo signal power 722 can be determined from the output of far end filter bank 708.

FIG. 7 also shows echo cancellation power subband signals 724 being estimated by adaptive filter 710 and subtracted from the microphone subband power signals before input to synthesis filter 730. Synthesis filter 730 performs the inverse operation of filter banks 706 and 708 by interpolating the subband signals to the original sampling rate and summing them together. The synthesis filter 730 may be implemented using a polyphase structure for efficiency.

The present invention may also estimate background noise power estimator 732 to determine the microphone signal activity. In human speech, there are typically gaps between each word. The power level of the gaps is very low compared to the power level of the near endpoint or far endpoint signals during speech, and can be used as a measure of the background noise. In one embodiment, the near end background signal power 716 and the far end background signal power 717 is estimated in background noise power estimator 732 and process 304 (FIG. 3) using processes shown in FIG. 8.

Figure 8:
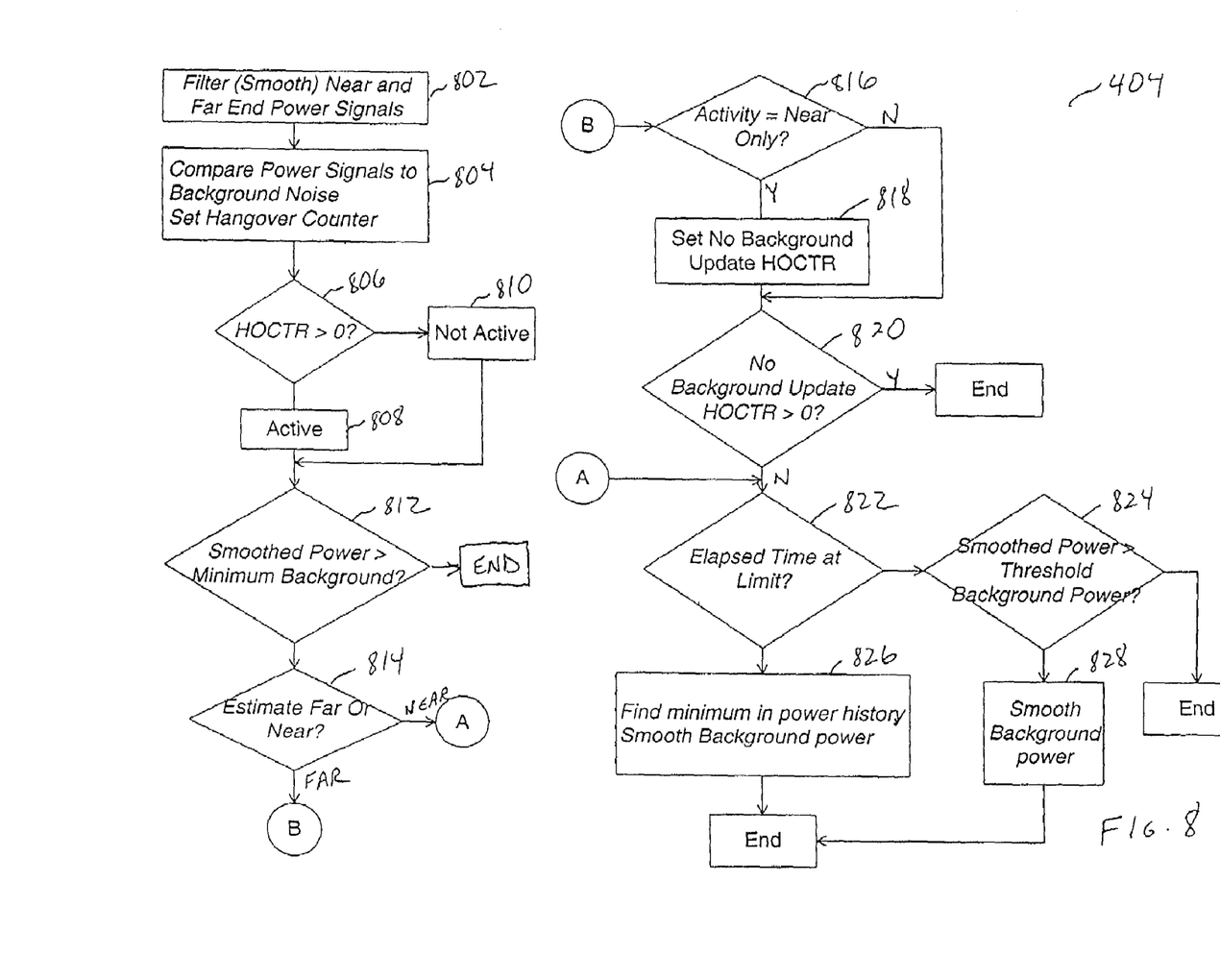
FIG. 8 is a flowchart of a method for estimating background noise in accordance with the present invention.

Referring now to FIGS. 7 and 8, the current values of far endpoint power level 720 and near endpoint power level are combined and filtered using a smoothing filter having a fast time constant in process 802. Process 802 includes sampling the near end and far end background noise periodically, for example, every 1.6 seconds, to update the background noise power signals 716, 717. The most recent samples of the smoothed power levels are stored in a buffer.

Logic in process 804 then checks whether the current short term signal power (curpwr) exceeds the background noise power by predefined thresholds. If so, a hangover counter (HOCTR) is set in process 806 to allow the speech activity indicator to hangover for some time right after it crosses a predetermined threshold. If HOCTR is set greater than zero, "active" is declared in process 808. Otherwise, a "not active" indicator is set in process 810. An example of pseudocode in process 804 for setting HOCTR to one of several hold-over counter values (HOCTR1, HOCTR2, or HOCTR3), depending on whether the current signal power (smoothed power) exceeds the background noise power by the thresholds THRSH3, THRSH2, or THRSH1, is shown as follows:

If smoothed_power > THRSH3 * background_power,
 HOCTR += HOCTR3
 else if smoothed_Power > THRSH2 * background_power, HOCTR += HOCTR2
 else if smoothed_power > THRSH1 * background_power, HOCTR += HOCTR1
 else HOCTR = max (HOCTR −1, 0)

In process 812, if smoothed power ("sp") is greater than the minimum background noise signal, then process 814 is executed to determine whether the background noise is being estimated at the far end. Otherwise, the process of determining the background noise ends. If process 814 is executed, then process 816 checks whether the activity detected is at the near end. If so, then NoBkgUpdHoctr (no background update holdover counter) is set in process 818 and it is used to determine whether to estimate the far endpoint background noise power 716 in process 820.

If the variable NoBkgUpdHoctr is greater than zero, process 822 checks whether a predetermined amount of time has passed. The result of logic in processes 814 through 820 is that far endpoint background noise is not estimated until there is some speech activity detected on the far endpoint during each time period. Also, if the current signal power is less than a predefined minimum background power, the background noise is not estimated. This is because the far endpoint system may suppress the outgoing signal to eliminate echo when there is near endpoint activity only. The near endpoint system will receive a much lower power signal, during the time period, however, which does not give any information on the far endpoint background noise power.

In process 826, the minimum value of the smoothed power from the buffer is selected at the end of the predetermined time period. This value is then used to smooth the background noise estimate. Background noise power can be updated more often if the level has changed more than a predetermined threshold, such as five times the current background noise estimate, as shown in processes 824 and 828. This allows faster tracking in a noisy room and provides an average room noise level instead of a minimum noise level.

Referring again to FIGS. 3 and 7, once the near end background noise power 716 and the far end background noise power 717 is estimated as indicated in process 304, process 306 controls adaptation of adaptive filter 710. In order to determine when to adapt the filter coefficients, the present invention includes process 314 for detecting speech activity and determining the state (i.e., near end activity, far end activity, double talk, half duplex, and idle states) of the environment for the AEC 211. Process 314 is further discussed hereinbelow. The coefficients of adaptive filter 710 of each subband are adapted only when the following three conditions are met:

Condition 1. The adapt_flag is true;
Condition 2. The far endpoint power, i.e., speaker subband power signal 718, of the particular subband is above the noise floor for the subband. This Condition ensures that the far endpoint is active in this subband; and
Condition 3. The power of the far endpoint echo signal 722 is greater than the background noise power signal 716 times a "no adapt" factor. The Condition may be represented in equation form as follows, using labels for the signals as shown in FIG. 7:

Echo_cancellation_power[m]
 >Microphone_subband_power[m]
 *no_adapt_factor

Regarding Condition 1, the adapt_flag is set true if activity is detected at the far endpoint. Otherwise, the adapt_flag is false. If the adapt_flag is true, then it can be set false if the following two conditions are met:

a. one of the subband microphone input power signals is very high, i.e.,

Echo_cancellation_power[m]
 >Microphone_subband_power[m]
 *no_adapt_factor; and b. the system is not in the half-duplex state, which is a state wherein the adaptive filter 710 is forced to adapt quickly after a possible sudden change in the room environment.

Condition 3 is primarily useful during the double talk state. The person speaking at the near endpoint may have a different speech spectrum compared to the person speaking at the far endpoint. The adaptive filter 710 continues to adapt for subbands that do not have much near endpoint power. For other subbands, when near endpoint power reaches a predetermined threshold, the double talk state is detected, and the adaptive filter 710 should not adapt. The parameter "noadapt_factor" is re-determined periodically during use of the system, so that there is no limitation on where the speakers and microphones are positioned. Their relative energy level, or power, is accounted for by the noadapt_factor, which is estimated as follows:

```
if ((activity = far endpoint only) and (farhoctr >= 20))
    tt = min(adapt_ratio(1:M));
    /* adapt_ratio[m] =
            echo_cancellation_power[m]/microphone_subband_power[m]*/
    tt = min(tt, 0.2);
    tt = max(tt, 0.01);          /* boundary of noadapt_factor */
    if (tt < noadapt_factor)
        noadapt_factor = tt;
    else
        noadapt_factor = 0.9*noadapt_factor + 0.1*tt;
    end
end
```

Determining the step size for the adaptive filter 710 is also different in different states. If the far endpoint power is very high, then $\mu=1.0$, and the filter adapts very quickly. But if the double talk state is detected in M consecutive blocks, then $\mu$ is lowered by half, so that the adaptive filter will not diverge rapidly in case the adaptation is incorrect. The filter does not adapt during the double talk state. When the filter has not converged, however, false activity may be detected, such as detecting far endpoint only state as double talk state.

If adaptation is disabled during an incorrectly detected double talk state, the filter will go to a dead lock state and will never adapt to the room model. Finally, if there is a far endpoint signal, but the power is low, $\mu$ is very small, for example, 0.01.

Referring again to FIGS. 3 and 7, process 308 includes determining echo subband signals and subtracting, or cancelling, the echo from the signal being sent from the near end to the far end point. Coefficients in adaptive filter 710 are adapted to fit the room model based on the difference between the far endpoint input sample for each subband and the near endpoint input in the corresponding subband. The error signal is then fed back to adaptive filter 710 to direct the adaptation of the filter coefficients with the objective to drive the error signal to minimum. In one embodiment, the coefficients are adapted in this manner using the normalized least-mean-square (NLMS) method with the adaptation step size of $\mu$ as described hereinbelow.

The adaptation equation for the k-th tap weight of the i-th subband $w_i[k]$ at any sample time index n using NLMS for the adaptation of filter coefficients is given by:

$$w_i[k] \leftarrow w_i[k] + \mu e_i * x_i[n-k]/\max(P(x_i)*\text{tail\_length, bias})$$

where $x_i$ is the far endpoint input subband signal, $P(x_i)$ is the power normalization factor and can be estimated by non-linear filtering of input signal x as follows:

$$P(x_i) = (1-\alpha)*P(x_i) + \alpha*\text{instant power},$$

where instant power = $|\text{real}(x_j)|^2 + |\text{imag}(x_j)|^2$, bias is a small positive number to desensitize the tap-weight correction term against variance in the power estimate, such that the step size will not become unduly large to cause computational instability and tail length is selected from the following table:

| Band | 0–4 | 5–6 | 7–8 | 9 | 10–13 | 14–15 | 16–17 | 18–31 |
|---|---|---|---|---|---|---|---|---|
| Tail Length at 8 kHz | 55 | 50 | 50 | 50 | 40 | 35 | | |
| Tail Length at 16 kHz | 50 | 50 | 45 | 40 | 30 | 30 | 30 | 18 |

The echo cancellation window at 8 KHz sampling rate is 171.875 ms, while at 16 KHz sampling rate is 156.25 ms.

In process 310, subband output signals 726 are added together to provide an estimate of the power.

The value of the echo return loss enchancement (ERLE) is determined in process 312, and it indicates how well the adaptive filter 710 has filtered out any echo. It is the ratio of microphone full signal power 714 and echo cancellation power signal 724. The larger the number is, the better the adaptive filter coefficients fit the room model. If only echo is input into the microphone, there is no near endpoint speech, and the adaptive filter is well-adapted. When the adaptive filter 710 is well-adapted, the echo cancellation power signal 724 should be very low, resulting a large value for ERLE, i.e., less than 10 decibals. But if there is near endpoint speech, the echo cancellation power signal 724 contains the near endpoint speech, which power should be quite high, resulting in a small value for ERLE (usually around 0 dB). Thus, the value of ERLE indicates whether there is near endpoint speech with the assumption that the adaptive filter 710 is already well-adapted to the room model.

If the filter coefficients have not converged, the value ERLE power may also be low, so further calculation is required to detect double talk more accurately. This requires identifying the current state of the system. Table 1 shows the four possible activity states as, i.e., whether speech is occurring at the near end (NEAREND state), the far end (FAREND state), both ends (DOUBLETALK state), or neither end (IDLE state).

TABLE 1

Activity States

| State Label | Description | Far End Activity | MIC Input Activity | Near End Activity |
|---|---|---|---|---|
| IDLE | Idle | Inactive | Inactive | X |
| FAREND | Far End Only | Active | X | Inactive |
| NEAREND | Near End Only | Inactive | Active | X |
| DOUBLETALK | Double Talk | Active | X | Active |

Figure 9:
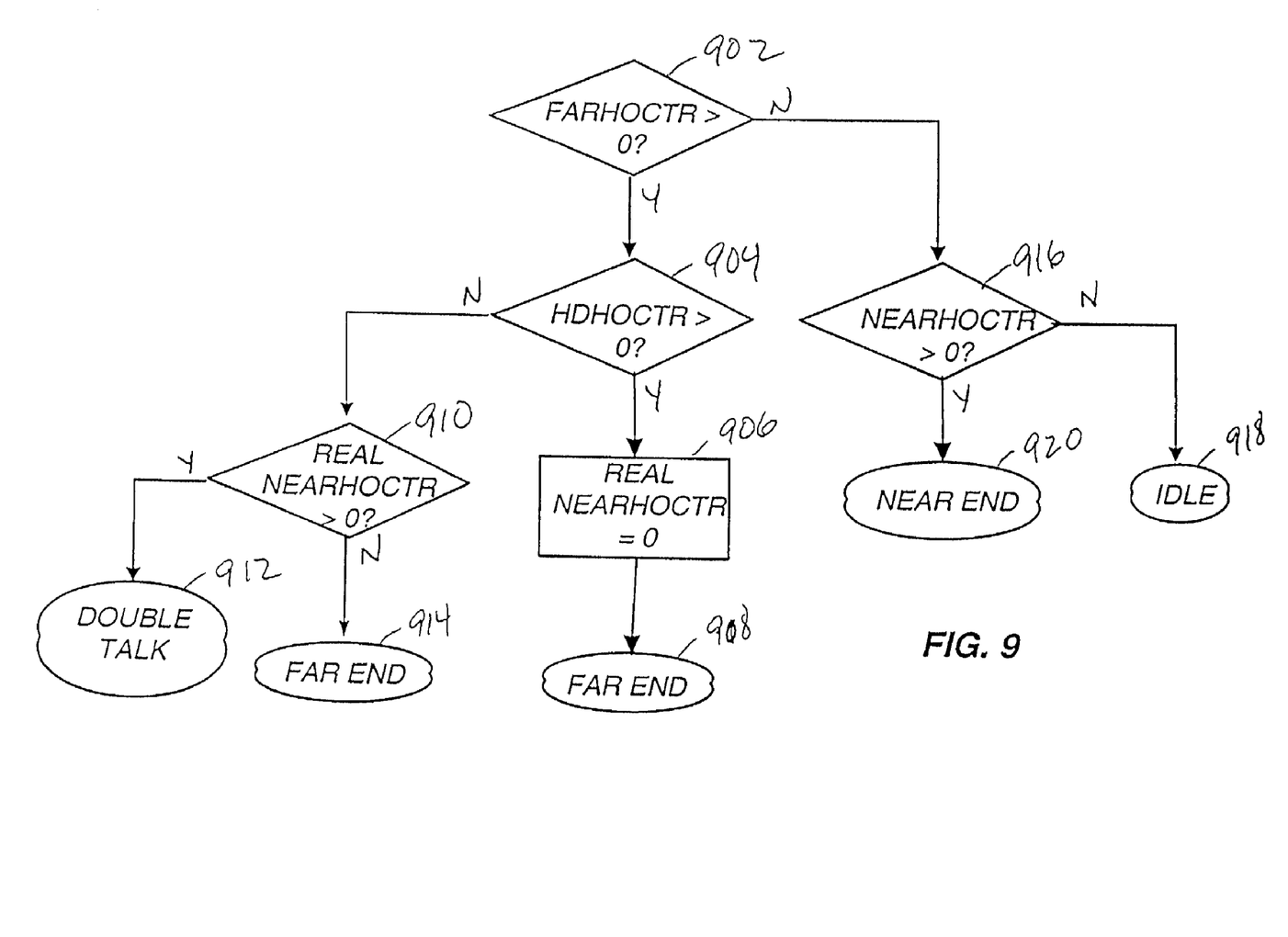
FIG. 9 is a flowchart of an embodiment of a method for determining the system's activity state in accordance with the present invention.

In one embodiment, process 314 includes detecting the current system state based on the values of the far end hang over counter (FARHOCTR), the near end hang over counter (NEARHOCTR), and the half-duplex hang over counter (HDHOCTR). A flowchart of a method for determining the current system state is shown in FIG. 9. If FARHOCTR and HDHOCTR are greater than zero in decision processes 902 and 904, then REAL_NEARHOCTR is set to zero and the FAREND state is detected in processes 906 and 908, respectively. If HDHOCTR is less than or equal to zero in decision process 904, the decision process 910 tests whether REAL_NEARHOCTR is greater than zero. If so, then the DOUBLETALK state is detected in process 912. Otherwise, process 914 detects the FAREND state. Referring back to decision processes 902 and 916, if FARHOCTR and NEARHOCTR are less than or equal to zero, then the IDLE state is detected in process 918. If NEARHOCTR is greater than zero in decision process 916, then process 920 detects the NEAREND state.

FARHOCTR and NEARHOCTR are calculated, and they indicate the activity of the speaker output and microphone input signals. HDHOCTR indicates a period where the system should behave like half-duplex and is set to 1 second right after system initialization to allow fast tracking after start up. The HDHOCTR is set when far end activity is detected and the previous state was IDLE. This is based on the assumption that speech does not occur at the near end and far end at exactly the same time, i.e., it is assumed that speech at both ends occurs at least 100 milliseconds apart. So when speech does not occur for some time, and then it occurs at the far end, the following 100 milliseconds are considered to be far end only state, with no double talk during the 100 milliseconds. This reduces the echo, even when there is sudden change in the room environment. The adaptive filter 710 (FIG. 7) is allowed to adapt quickly during this 100 milliseconds to keep the coefficients up to date.

REAL_NEARHOCTR differs from NEARHOCTR because it represents the real near end activity after taking out the echo estimate from microphone input signal, and not the microphone input activity. REAL_NEARHOCTR is calculated as follows:

```
if (ERLE<=3.5)/* 10 dB */
{
    if (nePwrEst>(8* dt_thrsh))
        REAL_NEARHOCTR += 4;
    else if (nePwrEst>(4* dt_thrsh))
        REAL_NEARHOCTR += 2;
    else if (nePwrEst>(2* dt_thrsh))
        REAL_NEARHOCTR += 1;
    else
        REAL_NEARHOCTR -= 1;
}
else
    REAL_NEARHOCTR -= 2,
NEAR_HOMAX = max(REAL_NEARHOCTR,0);
REAL_NEARHOCTR = min(REAL_NEARHOCTR,
    NEAR_HOMAX);
``` where:

nePwrEst is the level estimation of near end speech and is a smoothed value of tnpwr, which is the summation of the maximum value of:

(microphone_subband_power_signal[m]
−echo_cancellation_power[m], 0.0))

In one implementation, only the maximum values of the first 12 subbands are summed, since most of the speech energy is in these bands; and $$dt\_thrsh=0.999*dt\_thrsh+0.001*tnpwr$$

dt_thrsh is similar to the near end background power 716 (FIG. 7) and it takes into account the speaker power 720. dt_thrsh is also adaptive, and its value depends on the room environment, i.e., whether the room is noisy or quiet. In one implementation, dt_thrsh is estimated when no far end or near end speech is present, and tnpwr is less than twice the near end background signal power 716.

After subband echo cancellation in process 308, the residual echo may still be audible especially in the absence of near endpoint speech, which can provide some degree of masking on the residual echo. Furthermore, the room environment model may vary such that the adaptive filter 710 may never converge to completely remove the echo signal. Additional suppression is therefore determined in process 316 to remove the residual echo and improve the overall audio quality.

Figure 10:
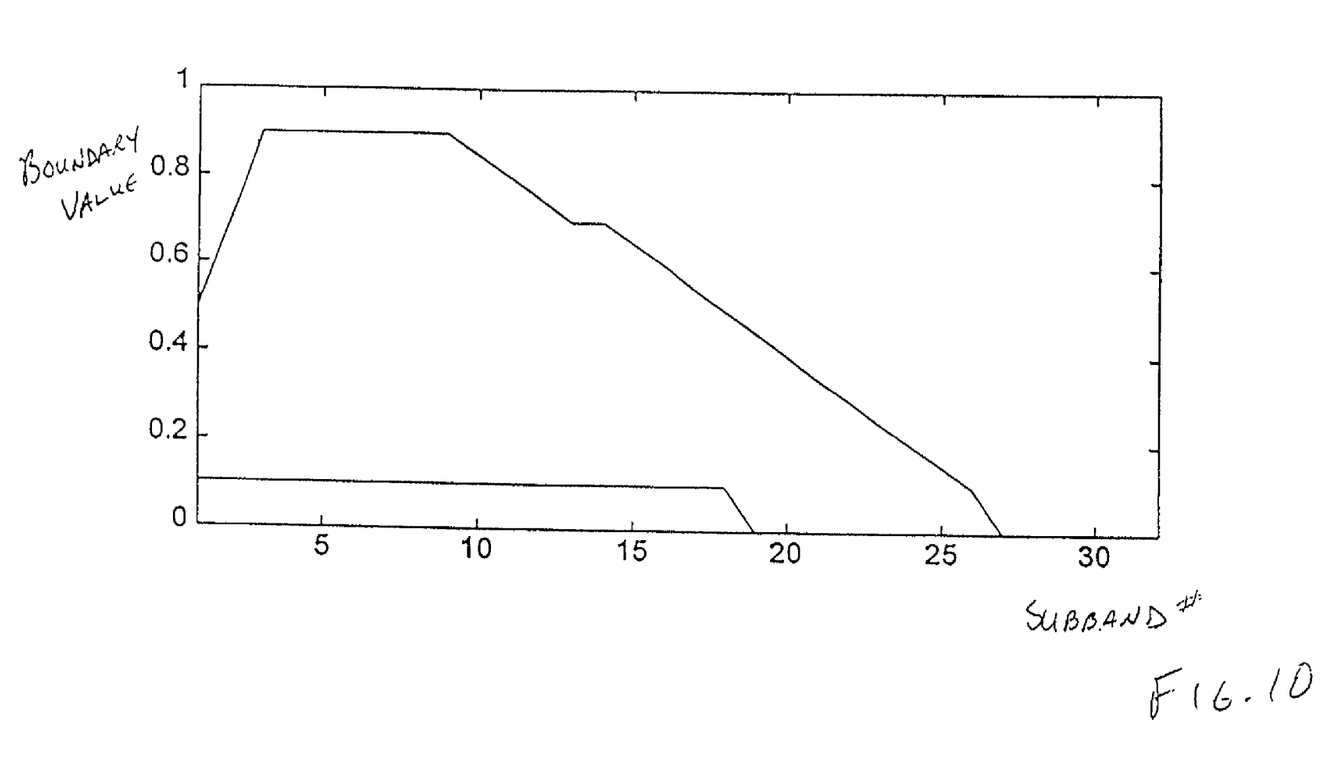
FIG. 10 is a flowchart of an embodiment of an acoustic echo suppression method in accordance with the present invention.
Figure 11:
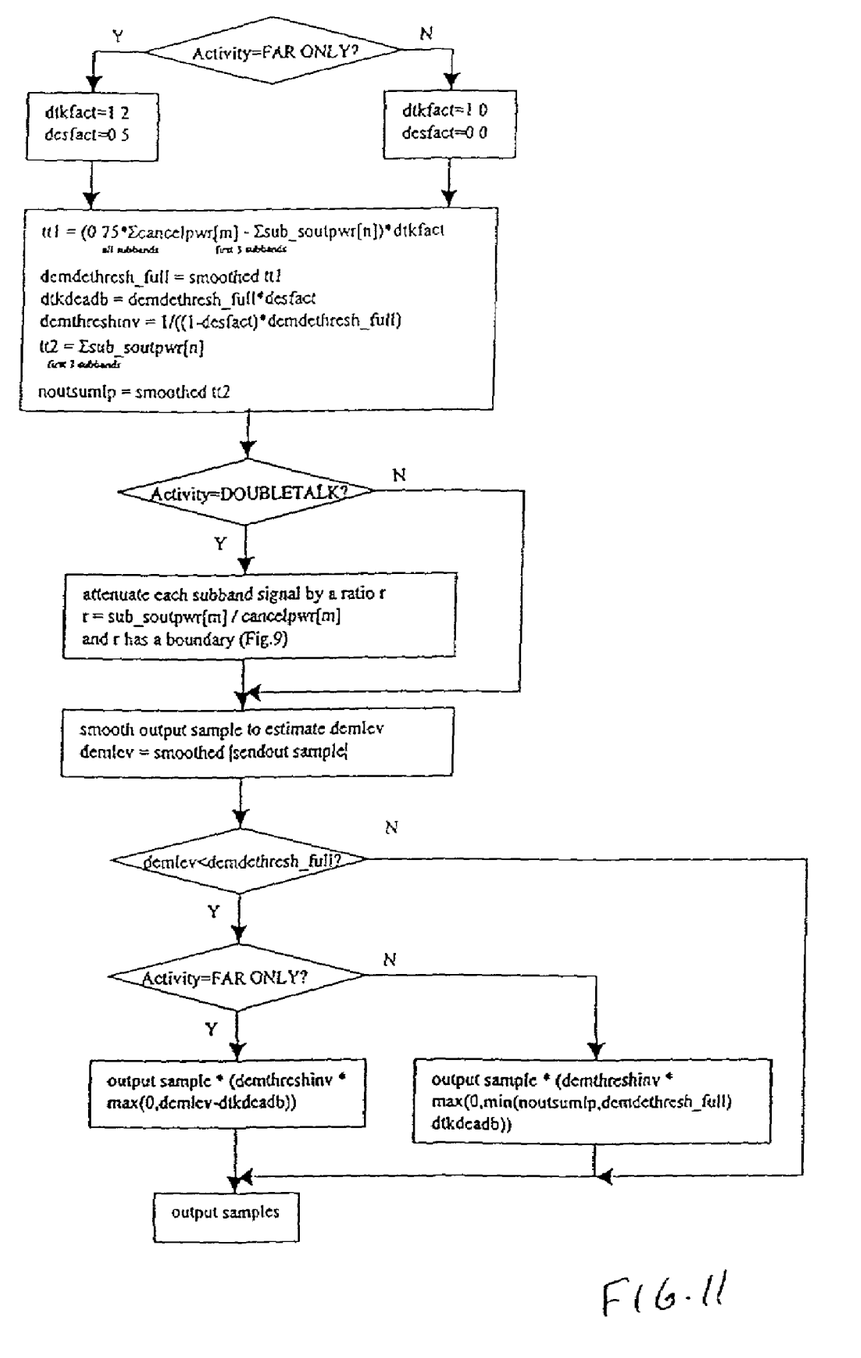
FIG. 11 is a graph of boundary values versus subband number that may be utilized to limit the ratio of output power subband signals and echo cancellation power subband signals in accordance with the present invention.

Referring now to FIG. 10, a flowchart of a method for providing additional echo suppression is shown. In the implementation shown, the degree of suppression in process 1000 depends on the current system activity. There is no suppression in the IDLE or NEAREND states, strong suppression in the FAREND state, and some attenuation in the DOUBLETALK state. The suppression is mainly done to the full band output signal 726 (FIG. 7) to avoid distortion. But in the DOUBLETALK state, some attenuation is done in the subband signals to reduce the residual echo during double talk as much as possible. The attenuation is based on the ratio of output power subband signals 726 and echo cancellation power subband signals 724 for the mth subband. If the echo estimate is high in a certain subband, the attenuation ratio will be small, and more attenuation will be provided. On the other hand, if the echo estimate is low in a certain subband, there will be less attenuation. The ratio is limited to a bounded region 1100 as shown in FIG. 11. For each subband, if the calculated ratio falls into the bounded region 1100, the calculated ratio is used. Otherwise, the boundary value is used. The bounded region 1100 shows that there is more attenuation for higher subbands than for the lower subbands.

In the full band suppression part, far endpoint only and double talk state use different variables to do suppression, as shown by the use of different values for dtkfact, desfact. In the DOUBLETALK state, it uses noutsumlp which value is much higher than dempwr, this resulting less suppression in double talk. If we want to make the double talk performance toward more half-duplex or toward more full-duplex, we can change the calculation of noutsumlp to make the value lower or higher.

While the present invention is described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other media storage and distribution systems.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. An apparatus for canceling far endpoint echo signals in audio signals transmitted from a near endpoint to a far endpoint, the apparatus comprising:
    a near endpoint analysis filter bank operable to divide a near endpoint signal into a plurality of near endpoint subband signals, wherein the near endpoint analysis filter bank estimates power in the plurality of near endpoint subband signals;
    a far endpoint analysis filter bank operable to divide a far endpoint signal into a plurality of far endpoint subband signals, wherein the far endpoint analysis filter bank estimates power in the plurality of far endpoint subband signals;
    a background signal power estimator operable to estimate a background noise; and
    logic for determining whether the estimated power in the plurality of far and near endpoint subband signals exceeds the background noise by a predefined threshold;
    wherein if the estimated power in the plurality of far and near endpoint subband signals exceeds the background noise by the predefined threshold, then a counter is set to allow a speech activity indicator to hangover for a period of time.

2. The apparatus as recited in claim 1, wherein the counter is set to one of a plurality of counter values depending on which of a plurality of thresholds the estimated power in the plurality of far and near endpoint subband signal exceeds.

3. The apparatus as recited in claim 1, wherein the near end analysis filter bank divides a microphone input signal into the plurality of near endpoint subband signals.

4. The apparatus as recited in claim 3, wherein the far end analysis filter bank divides a speaker output signal into the plurality of far endpoint subband signals.

5. The apparatus as recited in claim 4, wherein short term speech activity in the microphone input signal and in the speaker output signal is detected by comparing a current short term power against a long term background noise power.

6. The apparatus as recited in claim 1, wherein the near endpoint analysis filter bank employs a plurality of filters, wherein a number of the plurality of filters is equal to a number of a plurality of subband signals inputted to the near endpoint analysis filter bank.

7. The apparatus as recited in claim 1, wherein the near endpoint analysis filter bank employs a single filter repeatedly used for each of a plurality of subband signals inputted to the near endpoint analysis filter bank.

8. The apparatus as recited in claim 1, wherein the far endpoint analysis filter bank employs a plurality of filters, wherein a number of the plurality of filters is equal to a number of a plurality of subband signals inputted to the far endpoint analysis filter bank.

9. The apparatus as recited in claim 1, wherein the far endpoint analysis filter bank employs a single filter repeatedly used for each of a plurality of subband signals inputted to the far endpoint analysis filter bank.

10. The apparatus as recited in claim 1, wherein the near endpoint analysis filter bank and the far endpoint analysis filter bank are polyphase filters.

11. The apparatus as recited in claim 1, wherein the far endpoint analysis filter outputs a speaker subband power signal, a speaker full power signal and an echo signal power signal.

12. The apparatus as recited in claim 11, wherein the speaker power signal, the speaker full power signal and the echo signal power signal are inputted to an adaptive filter, wherein the adaptive filter estimates echo cancellation power subband signals.

13. The apparatus as recited in claim 12, wherein the echo cancellation power subband signals are subtracted from microphone signals before being inputted to a synthesis filter.

14. The apparatus as recited in claim 13, wherein the synthesis filter performs an inverse operation of the near endpoint analysis filter bank and the far endpoint analysis filter bank.

15. A method for canceling far endpoint echo signals in audio signals transmitted from a near endpoint to a far endpoint comprising the steps of:
 dividing a microphone input signal into a first plurality of subband signals;
 dividing a speaker output signal into a second plurality of subband signals;
 estimating power in said first plurality and in said second plurality of subband signals;
 estimating a background noise; and
 determining whether the estimated power in the first and second plurality of subband signals exceeds the background noise by a predefined threshold;
 wherein if the estimated power in the first and second plurality of subband signals exceeds the background noise by the predefined threshold, then a counter is set to allow a speech activity indicator to hangover for a period of time.

16. A computer program product embodied in a machine readable medium for canceling far endpoint echo signals in audio signals transmitted from a near endpoint to a far endpoint comprising the programming steps of:
 dividing a microphone input signal into a first plurality of subband signals;
 dividing a speaker output signal into a second plurality of subband signals;
 estimating power in said first plurality and in said second plurality of subband signals;
 estimating a background noise; and
 determining whether the estimated power in the first and second plurality of subband signals exceeds the background noise by a predefined threshold;
 wherein if the estimated power in the first and second plurality of subband signals exceeds the background noise by the predefined threshold, then a counter is set to allow a speech activity indicator to hangover for a period of time.

\* \* \* \* \*